United States Patent
Aslin (10) Patent No.: US 6,348,087 B1
(45) Date of Patent: Feb. 19, 2002

(54) THREE PHASE CYCLONIC SEPARATOR

(75) Inventor: David J. Aslin, Cape Coral, FL (US)

(73) Assignee: Shaw Aero Devices, Inc., Fort Myers, FL (US)

( * ) Notice: Subject to any disclaimer, the term of this patent is extended or adjusted under 35 U.S.C. 154(b) by 0 days.

(21) Appl. No.: 09/479,878

(22) Filed: Jan. 10, 2000

(51) Int. Cl.$^7$ .............................................. B01D 19/00
(52) U.S. Cl. .............................. 96/210; 96/213; 96/216
(58) Field of Search ........................ 96/206, 208, 209, 96/210, 213, 216

(56) References Cited

U.S. PATENT DOCUMENTS

| | | |
|---|---|---|
| 770,582 A | 9/1904 | Hollingsworth |
| 2,010,435 A | 8/1935 | Matheson |
| 2,811,219 A | 10/1957 | Wenzl |
| 3,204,772 A | 9/1965 | Ruxton |
| 3,282,030 A * | 11/1966 | Griffo et al. .................. 96/210 |
| 3,494,110 A | 2/1970 | Reed et al. |
| 3,512,651 A | 5/1970 | Laval, Jr. |
| 3,726,068 A | 4/1973 | Lowrie |
| 3,755,996 A | 9/1973 | Klein et al. |
| 3,771,290 A | 11/1973 | Stethem |
| 3,802,164 A | 4/1974 | Bowen |
| 3,802,570 A | 4/1974 | Dehne |
| 3,848,550 A | 11/1974 | Bowen |
| 3,853,518 A | 12/1974 | Tu et al. |
| 4,076,507 A | 2/1978 | Hauberg |
| 4,147,630 A | 4/1979 | Laval, Jr. |
| 4,273,563 A | 6/1981 | Fadda et al. |
| 4,282,016 A | 8/1981 | Tauber et al. |
| 4,367,078 A | 1/1983 | Hendrix |
| 4,455,220 A | 6/1984 | Parker et al. |
| 4,551,247 A | 11/1985 | Borchert et al. |
| 4,778,488 A | 10/1988 | Koers |
| 4,795,561 A | 1/1989 | Aslin |
| 5,028,318 A | 7/1991 | Aslin |
| 5,116,488 A | 5/1992 | Torregrossa |
| 5,224,604 A | 7/1993 | Duczmal et al. |
| 5,262,046 A | 11/1993 | Forgac et al. |

FOREIGN PATENT DOCUMENTS

WO    WO 91/15302    10/1991

\* cited by examiner

Primary Examiner—Robert A. Hopkins
(74) Attorney, Agent, or Firm—Pennie & Edmonds LLP (57) ABSTRACT

A cyclonic separator is provided for separating a mixture containing three phases of mater into the constituent phases. The separator contains three concentric cylindrical chambers in fluid connection with each other. These three chambers are an upper chamber, a lower chamber, and an outlet chamber. Tangential fluid inlets and outlets are provided to minimize pressure loss across the separator. A radially disposed annular debris collector is located at the junction of the upper and lower chambers, and a gas support platform for directing gas out of the separator is disposed in the outlet chamber a sufficient distance from the debris collector so as to prevent turbulence adjacent the debris collector.

15 Claims, 10 Drawing Sheets

THREE PHASE CYCLONIC SEPARATOR

TECHNICAL FIELD

The present invention relates to cyclonic systems for separating debris particles and gases from fluids. More specifically, the present invention relates to low pressure drop, three-phase separators for use in scavenge type lubrication systems.

BACKGROUND

Cyclonic separators are known that use the centrifugal force generated by a fluid vortex to separate a three-phase mixture into its constituent solid, liquid, and gas phases. Various cyclonic separator arrangements have been made in an attempt to provide the highest possible percent recovery of solid debris and entrained gas from a liquid phase.

For example, U.S. Pat. No. 3,771,290 discloses a vortex de-aerator for separating gases from a flowing liquid. The vortex de-aerator includes a single hollow body of circular cross section and a perforated tube communicating with an air outlet. A perforate partition within the body defines upper and lower compartments. A tangential inlet and a tangential outlet are both connected to the lower compartment. A frusto conical screen is provided in the lower compartment between the inlet and outlet to intercept any solid matter in the liquid flow.

U.S. Pat. No. 3,802,570 discloses a cyclone separator for separating particles from a fluid stream. This cyclone separator includes a hollow housing having an upper cylindrical portion and a lower frustro-conical portion. A tangential entry converts the linear gas flow into a rotating vortex. A clean fluid outlet is mounted within the upper portion of the hollow housing for receiving cleaned fluid which flows upwardly from the center region of the vortex, and a truncated cone having a closed end is mounted in the exit region of the vortex tube for stabilizing and centering the vortex.

U.S. Pat. No. 4,076,507 is directed to a centrifugal separator for separating liquid and gas and having a circumferential cylindrical wall and a bottom having an upwardly extending, arched central part, the inner surface of which has a domed or convex shape. An upwardly open channel is defined between the inner surface of the circumferential wall and the inner surface of the central part of the container bottom. An inlet opening extends substantially tangentially in relation to the cylindrical wall, and a gas discharge tube extends centrally into the upper part of the container.

U.S. Pat. No. 5,028,318 is directed to a cyclonic system for separating debris particles from fluids. The separator disclosed includes an outer cylindrical housing and a generally cylindrical chamber. An inlet is adapted to inject the fluid tangentially onto the smooth inner cylindrical wall of the chamber. A vortex finder tube is disposed along the axis of the housing and is connected to one of the ends. Fluid exits through a funnel-shaped mouth at the bottom of the apparatus which communicates with a fluid outlet. A debris ring extends upward from the funnel-shaped mouth to maintain separation of particulate matter from the fluid which is directed into the funnel-shaped mouth. A debris outlet extends tangentially through the cylindrical wall of the housing.

U.S. Pat. No. 5,224,604 is directed to an apparatus and method for the separation of wet and dry particles. The separation is achieved in an apparatus combining a centrifugal field with a radial magnetic field and/or electric field. The apparatus includes a vessel having a circular shaped interior wall, at least a portion of which is porous, to introduce air. A tangential inlet is disposed at the upper end of the vessel for introducing a slurry. A froth pedestal is positioned within the lower end of the cylindrical vessel for supporting a froth core. Generally, the fluid steam and the hydrophillic particles are discharged through an annular opening between the vessel wall and the pedestal or are separated from the hydrophillic particles by a stream splitter.

SUMMARY OF THE INVENTION

In accordance with the present invention, a cyclonic three-phase separator that has no moving parts and can separate the three-phases of matter, namely liquids, solids and gases, is provided. The three-phase separator is capable of separating gas and solid phases out of a liquid phase by using centrifugal force and by capitalizing on the density differences that exist between each of the individual phases.

The three phase cyclonic separator includes an upper cylindrical chamber having a first end and a second end, a lower cylindrical chamber configured and positioned to be concentric with the upper cylindrical chamber and having a downstream end and an upstream end that is in fluid connection with the second end of the upper cylindrical chamber, a debris collector disposed in the separator for collecting solids from fluids passing therethrough, an outlet for allowing gases to exit the separator, a tangential inlet connected to the upper chamber between the first and second ends for introduction of a material to be separated, and a tangential fluid outlet in fluid connection with the lower chamber for allowing fluids to exit the separator.

In one embodiment of the three phase separator, the upper chamber has an inner circumference defining an upper chamber diameter. The lower chamber has an outer circumference defining a lower chamber diameter. The upstream end of the lower chamber extends into the second end of the upper chamber, and the debris collector is defined by a gap between the inner circumference and the outer circumference. Preferably, the gap is annular and concentric with the upper and lower chambers. The gap also includes a tangential debris slipstream outlet to reduce pressure losses associated with the debris collector.

A gas support platform can be disposed in the lower chamber a sufficient distance downstream of the debris collector to prevent turbulence adjacent the debris collector which would inhibit debris collection. In addition, the three phase separator can include a cylindrical fluid outlet chamber concentric with the upper and lower chambers and having an inlet end in fluid connection with the downstream end of the lower chamber, wherein the tangential fluid outlet is connected to the fluid outlet chamber to minimize outlet frictional losses. In a preferred embodiment, the gas support platform is disposed in the fluid outlet chamber, and a space is provided between the downstream end of the lower chamber and the gas support platform to prohibit obstruction and constriction of the fluid flow through the separator. In a more preferred embodiment, the gas support platform is cylindrical and concentric with the fluid outlet chamber for minimizing fluid flow losses.

The present invention is also directed to a three phase cyclonic separator having an upper cylindrical chamber having a first end and a second end, a lower cylindrical chamber configured and positioned to be concentric with the upper cylindrical chamber and having a downstream end and an upstream end in fluid connection with the second end of the upper cylindrical chamber, a debris collector disposed in the separator for collecting solids from fluids passing therethrough, an outlet for allowing gases to exit the separator, a tangential inlet connected to the upper chamber between the first and second ends for the introduction of material to be separated, a fluid outlet in fluid connection with one of the upper or lower chambers for allowing fluids to exit the separator, and a gas support platform disposed in one of said upper or lower chambers and spaced from the debris collector a distance sufficient to reduce turbulence adjacent the debris collector which would inhibit debris collection.

In one embodiment, the three phase separator also includes a cylindrical fluid outlet chamber concentric with the upper and lower chambers and having an inlet end in fluid connection with the downstream end of the lower chamber, wherein the fluid outlet is disposed in the fluid outlet chamber and tangentially connected thereto to reduce fluid outlet frictional losses associated with converting rotational kinetic energy to pressure energy. In another embodiment, the gas support platform is disposed in the fluid outlet chamber and spaced from the downstream end of the lower chamber to prohibit obstruction or constriction of the fluid flow through the separator. In a preferred embodiment, the gas support platform is cylindrical and concentric with the fluid outlet chamber for minimizing fluid flow losses.

In one embodiment of the three phase separator, the upper chamber has an inner circumference defining an upper chamber diameter. The lower chamber has an outer circumference defining a lower chamber diameter. The upstream end of the lower chamber extends into the second end of the upper chamber, and the debris collector is defined by a gap between the inner circumference and the outer circumference.

The present invention is also directed to a three phase cyclonic separator having an upper cylindrical chamber having a first end, a second end, and an inner circumference defining an upper chamber diameter, a lower cylindrical chamber configured and positioned to be concentric with the upper cylindrical chamber and having an upstream end in fluid connection with the second end of the upper chamber, a downstream end, and an outer circumference defining a lower chamber diameter, wherein the lower chamber diameter is less that the upper chamber diameter, and the upstream end of the lower chamber extends into the upper chamber, a debris collector defined by a gap between the inner circumference and the outer circumference, an outlet for allowing gases to exit the separator, a tangential inlet connected to the upper chamber between the first and second ends for introduction of a material to be separated, a cylindrical fluid outlet chamber concentric with the upper and lower chambers, the fluid outlet chamber having an inlet end in fluid connection with the downstream end of the lower chamber and a tangential fluid outlet for allowing fluids to exit the separator and for minimizing outlet frictional losses, gas support platform disposed in the fluid outlet chamber, and a space defined between the downstream end of the lower chamber and the gas support platform to prohibit obstruction and constriction of the fluid flow through the separator.

A three phase mixture to be separated is introduced to the separator through a tangential inlet in the upper chamber. A fluid vortex forms as the fluid passes through the upper chamber causing the fluid to move outward, the solid phase debris to impinge on the wall of the upper chamber, and the gas to be displaced toward the center of the separator. As the fluid passes from the upper chamber to the lower chamber carrying the solid debris with it, the debris is retained in a debris collector.

The fluid continues down the lower chamber and passes into the outlet chamber and into a fluid outlet tangentially connected to the fluid outlet chamber. The tangential connections minimize pressure drop across the connectors and increase efficiency.

The centrally displaced column of air progresses down the upper and lower chambers, contacts an air support platform, and exits the separator through the air outlet in the vortex locator tube that extends into the upper chamber. The gas support platform is spaced a sufficient distance downstream of the debris collector so as to minimize turbulence adjacent the debris collector be held in the debris collector.

DETAILED DESCRIPTION OF A PREFERRED EMBODIMENT

Figure 1:
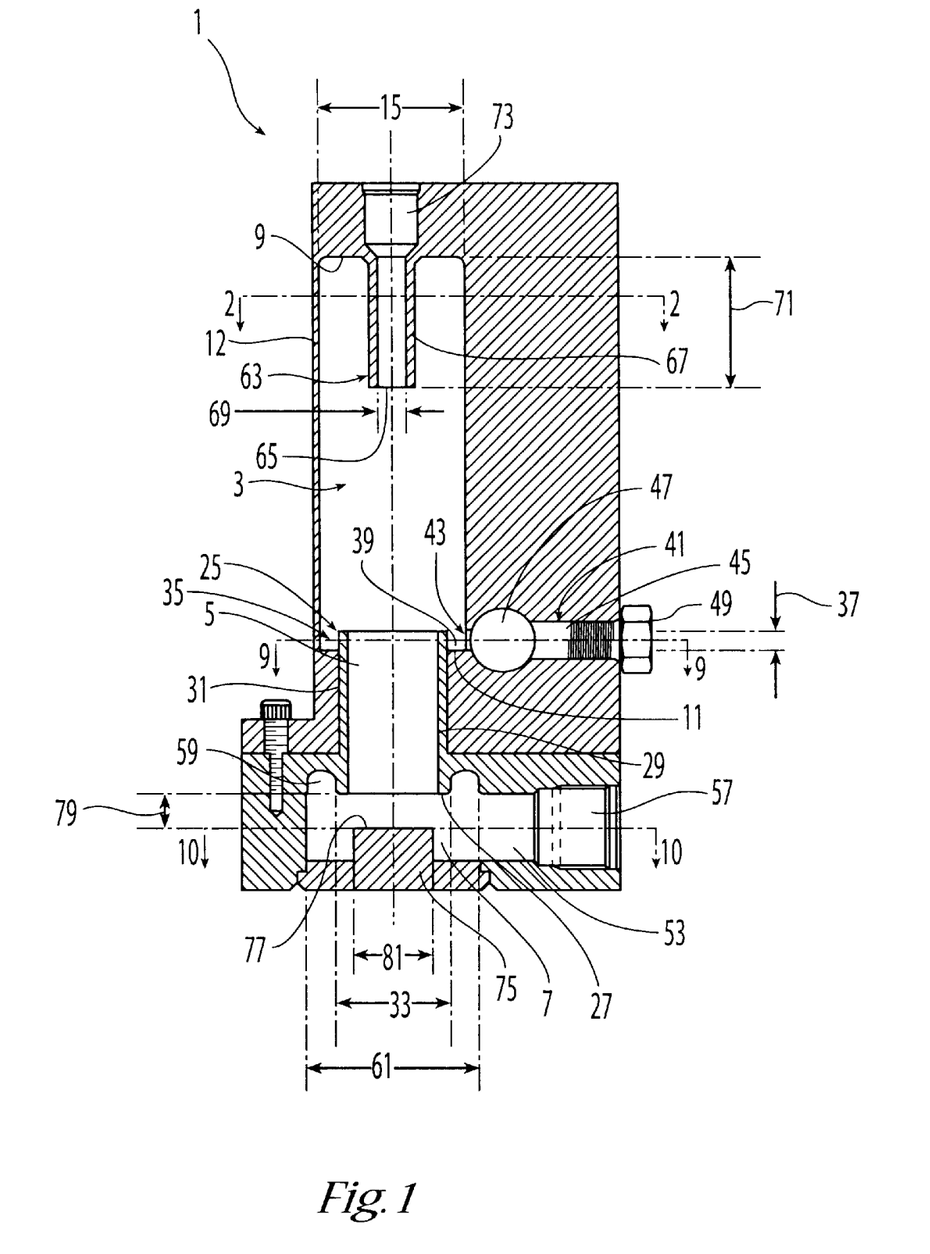
FIG. 1 is a cross sectional elevation view of the stand-alone embodiment separator of the present invention.

Referring initially to FIG. 1, the three phase cyclonic separator 1 includes an upper chamber 3 and a lower chamber 5. The separator 1 also includes a fluid outlet chamber 7. The upper, lower, and outlet chambers are generally cylindrical in shape.

The upper cylindrical chamber 3 includes a first end 9, a second end 11, and a wall 12. The wall 12 provides structure to the upper cylindrical chamber 3. The exterior dimensions and shape of the wall 12 are chosen to provide the desired amount of support for the operating conditions, such as temperature and pressure, of the separator 1. In addition, the exterior of the wall 12 may be shaped to permit either modular assembly and manifolding of multiple separators into a separator rack assembly or integral assembly and insertion into a reservoir tank. The interior of the wall 12 is dimensioned and shaped to provide the highest possible efficiency for separating solid, liquid and gas phases. Preferably, the upper chamber 3 is cylindrical, and the interior of the wall 12 is an inner circumference 13 that defines an upper chamber diameter 15.

Figure 2:
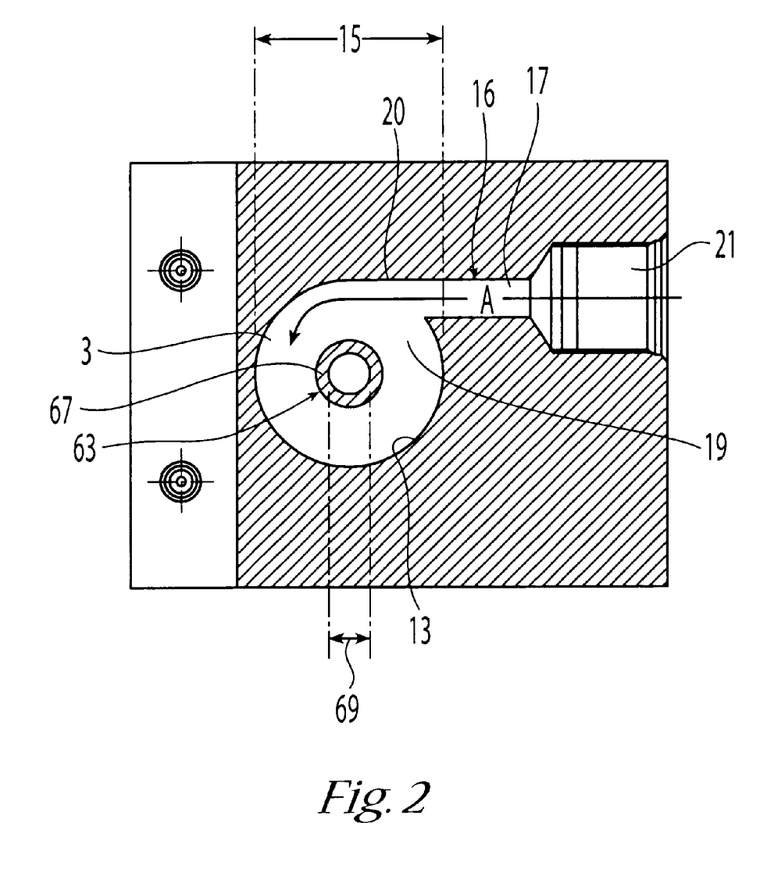
FIG. 2 is a cross sectional view of the separator through line 2—2 in FIG. 1.
Figure 3:
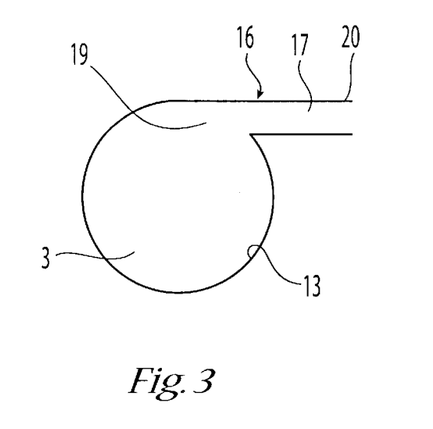
FIG. 3 is a schematic representation of a outer wall tangential fluid connection.
Figure 4:
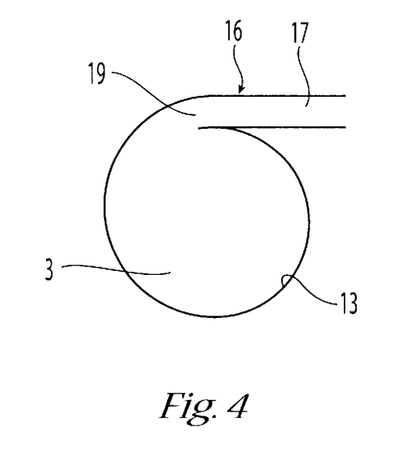
FIG. 4 is a schematic representation of an involute fluid connection.
Figure 5:
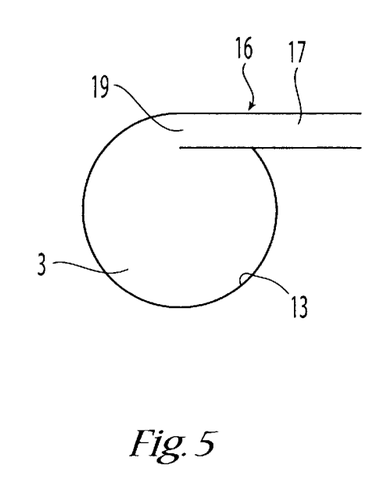
FIG. 5 is a schematic representation of a vaned entry fluid connection.
Figure 6:
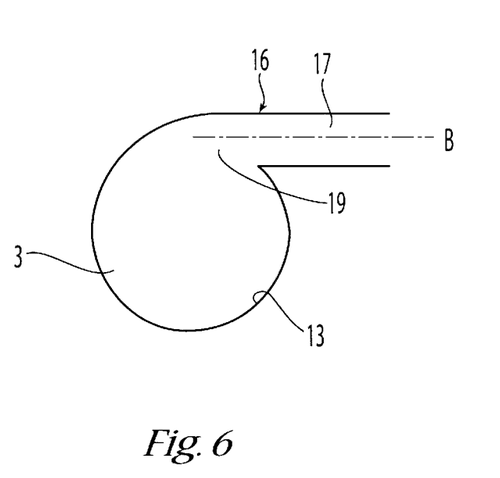
FIG. 6 is a schematic representation of a center line tangential fluid connection.

As is best shown in FIG. 2, an inlet 16 is disposed in the cylindrical wall 13 of the upper chamber 3 between the first end 9 and the second end 11. The inlet 16 includes a feed line 17 that intersects the cylindrical wall 12 at an inlet port 19. Preferably, the inlet port 19 is disposed adjacent the first end 9 of the upper chamber 3. In order to establish a vortex or rotational flow of the inlet fluid in the upper chamber 3 as indicated by arrow A in FIG. 2, the inlet 16 preferably intersects the cylindrical wall 12 tangentially. Various configurations of the tangential inlet 16 are possible. For example, the tangential inlet 16 can be an outer wall tangential inlet, FIG. 3, where the outer wall 20 of the feed line 17 is tangential to the cylindrical wall 12, an involute inlet, FIG. 4, a vaned entry inlet, FIG. 5, or a center line B of the feed line 17 tangential inlet, FIG. 6. Preferably, the feed line 17 is an outer wall tangential inlet. Inlet losses in converting pressure energy into a rotation flow are further minimized by making the approach to the tangential inlet port hydrodynamic.

Figure 7:
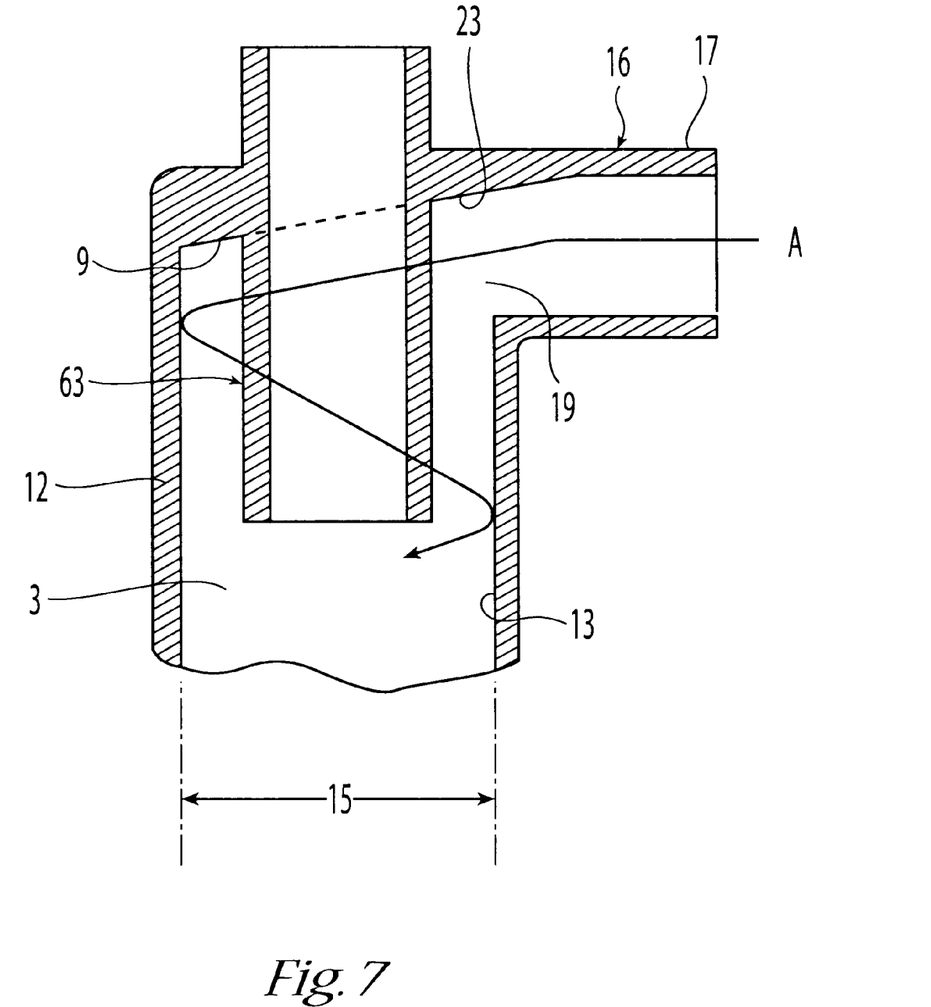
FIG. 7 is a partial cross sectional view of an alternative separator inlet.
Figure 8:
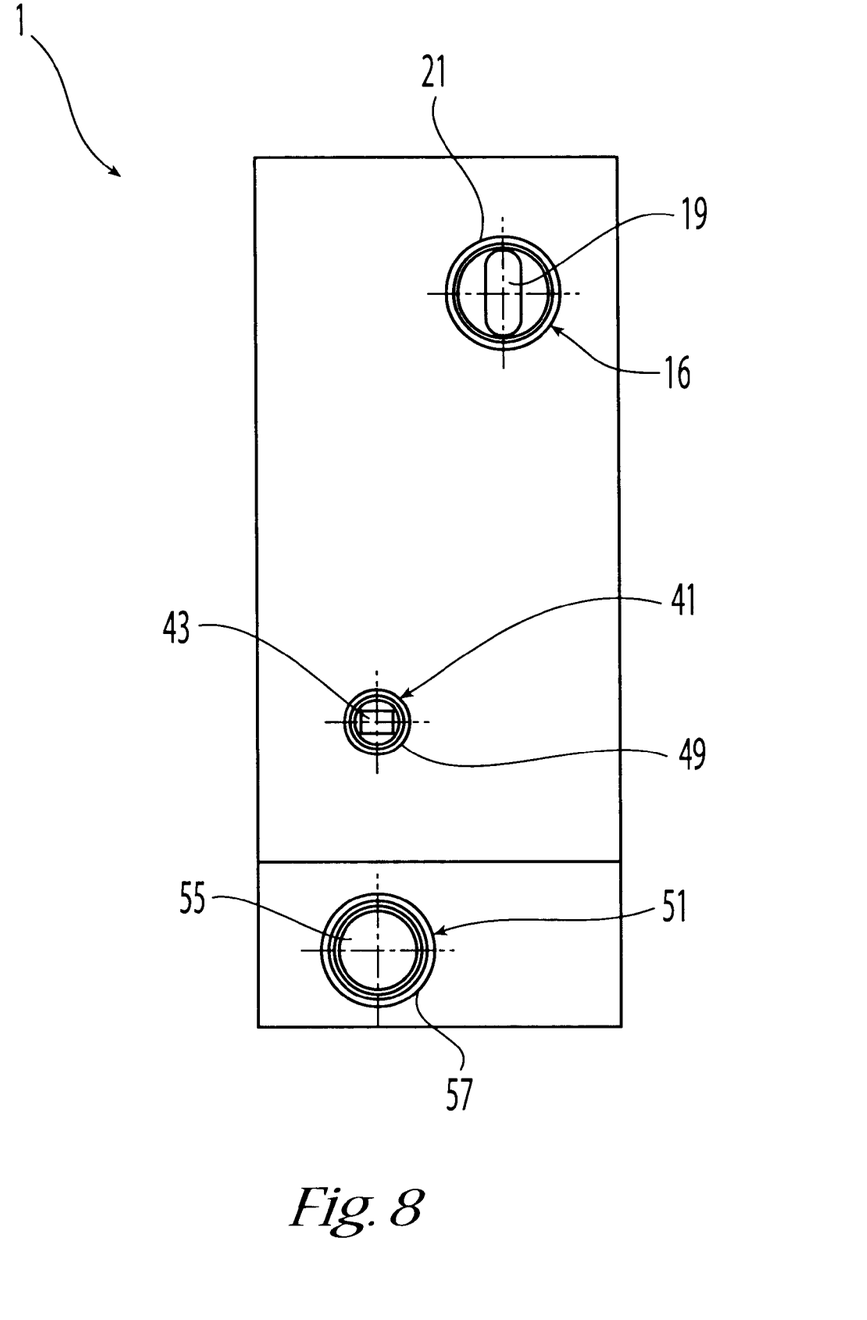
FIG. 8 is a elevation view of a side of the separator.

An inlet plumbing connection 21 for connecting the feed line 17 to standard or existing plumbing fittings may be provided at an end of the feed line 17 opposite the inlet port 19. As is best shown in FIG. 7, in order to induce the inlet fluid flow A down the upper cylindrical chamber 3 in a direction from the first end 9 toward the second end 11, the first end 9 may optionally be configured as an inclined ramp 23. As is best shown in FIG. 8, the inlet port 19 is generally rectangular or oblong in shape. In other words, the inlet port 19 preferably has a greater dimension in a direction from the first end 9 toward the second end 11 than around the inner circumference 13 of the cylindrical wall 12.

The lower cylindrical chamber 5 includes an upstream end 25, a downstream end 27, and a wall 29. The wall 29 is dimensioned to provide the necessary structural support for temperature, flow, and pressure conditions within the lower cylindrical chamber 5. The upstream end 25 is in fluid connection with the second end 11 of the upper chamber 3. As the lower cylindrical chamber 5 is preferably cylindrical, the wall 29 is also generally cylindrical and includes an outer circumference 31 that defines a lower chamber diameter 33. The lower chamber diameter 33 may be greater than, less than, or equal to the upper chamber diameter 15. Preferably, the lower chamber diameter 33 is less than the upper chamber diameter 15. Thus the diameter of the separator decreases as the fluid moves from the upper to the lower chamber. The lower cylindrical chamber 5 may be constructed from the same assembly as the upper chamber 3; however, the lower chamber 5 is preferably an independent assembly that is attached to the upper chamber 3.

In order to remove solid debris from the fluid stream in the separator 1, at least one debris collector 35 is disposed within the separator 1 in at least one of the upper or lower chambers. The debris collector 35 may be disposed between the first and second ends of the upper chamber 3, between the upstream and downstream ends of the lower chamber 5, or between the first end 9 of the upper chamber 3 and the downstream end 27 of the lower chamber 5. Suitable arrangements for the debris collector 35 include an annular protrusion extending radially outward or an annular constriction extending radially inward in either the upper or lower chambers. In order to minimize inhibition of fluid flow, the debris collector is preferably an annular protrusion extending radially outward from the cylindrical upper and lower chambers. A plurality of debris collectors may also be used disposed along the length of the upper and lower chambers.

As is best shown in FIG. 1, the upper chamber diameter 15 is preferably greater than the lower chamber diameter 33, permitting the upstream end 25 of the lower chamber 5 to extend into the second end 11 of the upper chamber 3 a distance 37. This difference in diameters also yields an annular gap 39 extending radially outward from the outer circumference 31 of the lower chamber 5. The debris collector 35 is defined by and disposed in this gap 39. Preferably, the annular gap 39 is concentric with the upper and lower chambers. The distance 37 and the radial size of the annular gap 39 defined by the difference between the upper chamber diameter 15 and the lower chamber diameter 33 are selected to provide for adequate removal of the size range of debris particles anticipated. The particle size range of interest in, for example, aircraft scavenges lube systems for failure prediction is 250×250×25 micron, up to 1,000× 1,000×100 micron particles. The 250×250×25 micron particles are normally the size of debris that suggests the onslaught of bearing or gear failure.

The debris collector 35 is arranged to remove the desired size of particles from the fluid stream and to monitor the size, number, and type of these particles. The debris collector 35 can be arranged in either a dead-end configuration or a slipstream configuration. In the dead-end configuration, the debris either accumulates directly in the debris collector 35 over time, or in a dead-ended passageway connected to the debris collector 35. In either type of dead-ended configuration, sensors are disposed in the debris collector 35, dead-ended passageway, or both. Suitable sensors include a chip collector/sensor plug, quantitative debris sensor, or a magnetic chip detector or collector for detecting ferrous debris.

Preferably, the debris collector 35 is arranged in the slipstream configuration. Pressure drop across the separator is lowered when the slipstream configuration is used, because the slipstream configuration provides an additional means for oil to flow out of the separator 1. This configuration reduces the amount of fluid that has to pass completely through the separator from inlet to outlet. Moreover, because the debris collector 35 is located at the interface of the upper and lower chambers, the pressure drop across the separator is reduced.

Figure 9:
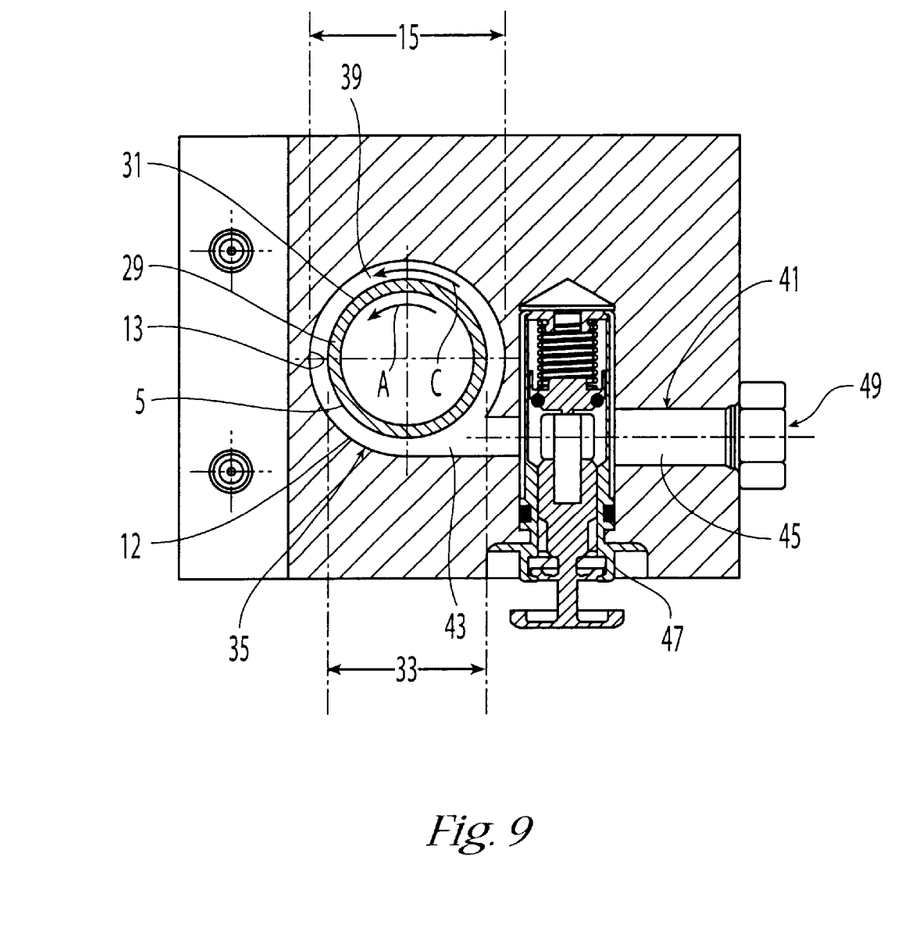
FIG. 9 is a cross sectional view of the separator through line 9—9 in FIG. 1.

In the slipstream configuration, a debris slipstream outlet assembly 41 is connected to the debris collector 35. As is best shown in FIGS. 1 and 9, the debris slipstream outlet assembly 41 includes a slipstream debris outlet 43 and a debris exit line 45. The debris exit line 45 preferably has a diameter from about 0.25 inches to about 0.375 inches. Sensors 47 such as those found in the dead-end configuration can be disposed in the debris exit line 45. The slipstream particle transport velocity is maintained depending upon the desired particle capture efficiency. Preferably, a minimum slipstream particle transport velocity of 7 feet per second is maintained in the debris slipstream outlet assembly 41 of the separator 1 to obtain the specified particle capture efficiencies. Additionally, the fluid in the debris slipstream outlet assembly 41 can be returned to the oil reservoir after passing through the slipstream outlet assembly 41 and past any debris sensors or collectors.

In order to reduce any pressure loss associated with the debris collector 35, the debris slipstream outlet 43 is tangentially connected to the debris collector 35 as is best shown in FIG. 9. Similar to the inlet 16, various tangential configurations can used, and the slipstream outlet assembly 41 is preferably arranged as an outer wall tangential slipstream. Moreover, the fluid and debris mixture will be rotating in the direction of arrow C in the debris collector 35, and arrow C indicates rotation in the same direction as arrow A. Thus, the debris slipstream outlet 43 is tangential to the debris collector 35 such as to be complementary to the direction of arrow C, further reducing pressure and flow loss and increasing the efficiency of the separator 1. Return of the fluid to a fluid supply reservoir or to waste is facilitated by a standard plumbing connection 49 located at an end of the debris exit line 45 opposite the end having the slipstream debris outlet 43. As is best shown in FIG. 8, the slipstream debris outlet 43 is preferably rectangular in cross section.

Figure 10:
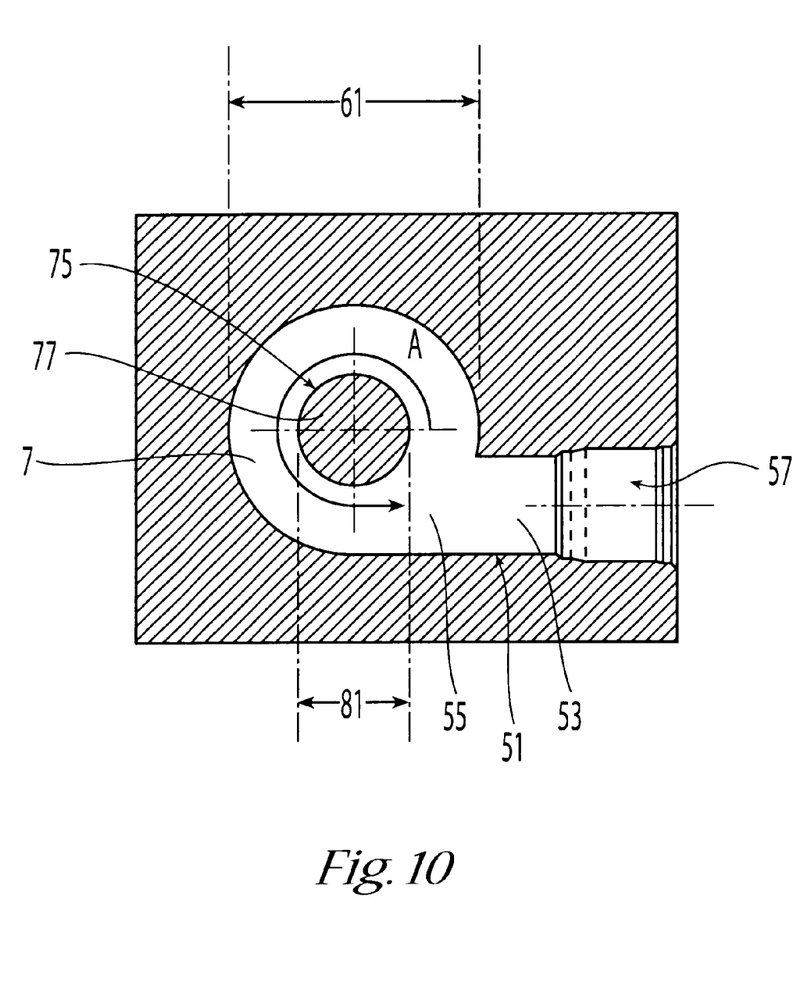
FIG. 10 is a cross sectional view of the separator through line 10—10 in FIG. 1.

As is best shown in FIGS. 1 and 10, at least one fluid outlet 51 is connected to the separator 1 to provide for the exit of fluid from the separator 1 that has had the gas and solid phases separated therefrom. The fluid outlet 51 can be in fluid connection with one of the upper or lower chambers. Preferably, the fluid outlet 51 is disposed in the outlet chamber 7 that is in fluid connection with one of the upper or lower chambers. The fluid outlet 51 is tangentially connected to the outlet chamber 7 as is best shown in FIG. 10. Similar to the inlet 16, various tangential configurations can used, and the fluid outlet 51 is preferably arranged as an outer wall tangential outlet. Moreover, the tangential outlet is complementary to the fluid rotational direction of arrow A further reducing pressure and flow loss and increasing the efficiency of the separator 1. Making the oil outlet tangential minimizes oil outlet frictional losses associated with converting rotational kinetic energy to pressure energy.

The fluid outlet 51 includes an outlet line 53 connected to a tangential outlet port 55. A standard outlet plumbing connection 57 is disposed in the outlet line 53 at an end opposite the outlet port 55. The inlet end 59 of the outlet chamber 7 is in fluid connection with the downstream end 27 of the lower chamber 5. As is best shown in FIG. 8, the outlet port 55 is circular in cross section. As is best shown in FIG. 10, the fluid outlet chamber 7 is preferably circular in cross-section and is concentric with the upper and lower chambers. The outlet chamber diameter 61 can be equal to, greater than, or less than the upper and lower chamber diameters. Preferably, the outlet chamber diameter 61 is greater than both the upper and lower chamber diameters, and the downstream end 27 of the lower chamber 5 extends into the inlet end 59 of the outlet chamber 7. This arrangement in combination with the tangential fluid outlet 51 further minimizes outlet friction losses. The fluid outlet chamber 7 can be formed from the same assembly as the upper and lower chambers. As is best shown in FIG. 1, the fluid outlet chamber 7 and the lower chamber 5 are formed of a single assembly that is attached to an assembly containing the upper chamber 3.

In order to provide for the exhaust or collection of gases liberated from the fluid by the three phase separator 1, a gas outlet 63 is disposed in either the upper chamber 3, lower chamber 5, or fluid outlet chamber 7. Preferably, the gas outlet 63 is disposed in the first end 9 of the upper chamber 3. The gas outlet 63 includes a gas outlet port 65 located at one end of a vortex finder tube 67. Preferably, the vortex finder tube 67 is cylindrical and concentric with the upper chamber 3, and the gas outlet port 65 is circular in cross section. Thus, the locator tube 67 and outlet port 65 will be positioned in the center of the fluid vortex formed in the upper chamber 3. The gas outlet port diameter 69 is selected to provide adequate flow for the volume of gas removed from the fluid. The vortex finder tube 67 extends into the upper chamber 3 a distance 71. This distance 71 is selected so as to locate the outlet port 65 at a position to minimize the turbulence at the outlet port 65 caused by the inlet, fluid outlet, and debris collector. Located at an end of the vortex finder tube 67 opposite the outlet port 65 is a standard plumbing connection 73. Preferably, the gas outlet 63 is arranged as part of the same assembly as the upper chamber 3, although the gas outlet 63 could be an independent structure that is fixed to the upper chamber 3.

A gas support platform 75 is provided and is disposed in either the upper chamber 3, lower chamber 5, or outlet chamber 7. The gas support platform 75 is spaced a sufficient distance from the debris collector 35 to prevent turbulence adjacent the debris collector capable of inhibiting debris collection. This can be accomplished with the gas support platform disposed in the lower chamber 5 adjacent the downstream end 27. Preferably, the gas support platform 75 is disposed in the outlet chamber 7 and is downstream of the debris collector 35. The gas support platform 75 includes a gas support top 77, and the gas support platform 75 is disposed in the outlet chamber 7 so as to define a space 79 between the downstream end 27 of the lower chamber 5 and the gas support top 77. The space 79 is of sufficient size to prohibit obstruction or constriction of the fluid flow through the separator 1. As is best shown in FIG. 10, the gas support platform 75 is preferably cylindrical or circular in cross section and is concentric with the upper, lower, and outlet chambers. The platform diameter 81 is selected to provide the necessary surface area for the gas support top 77 for the gas flow through the separator 1. The support platform 75 can be included in the same assembly with the lower and outlet chambers, but as is best shown in FIG. 1, the support platform 75 is made from an independent assembly that is attached to the outlet chamber 7.

Figure 11:
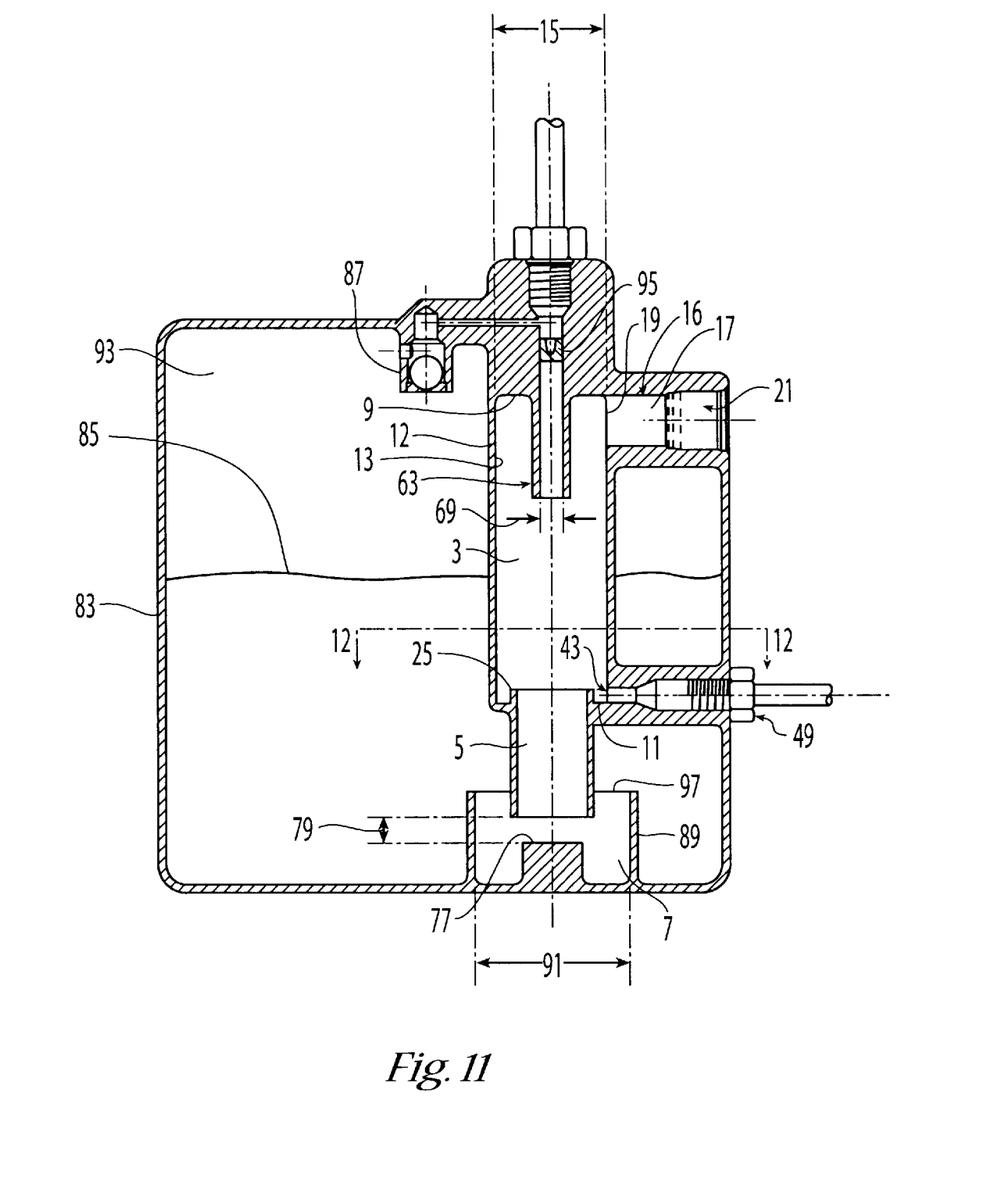
FIG. 11 is a cross sectional elevation view of the in-tank embodiment of the separator of the present invention.
Figure 12:
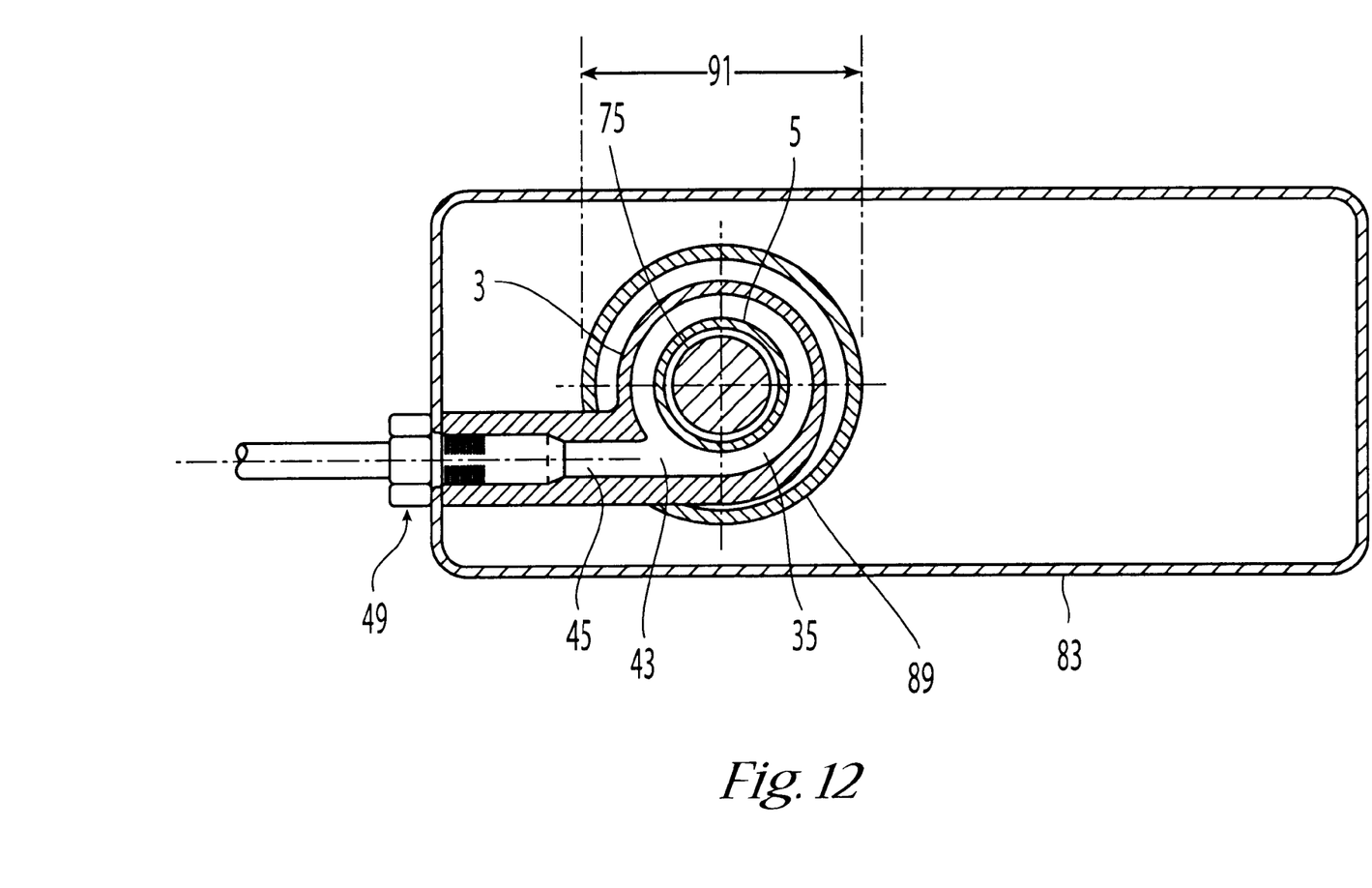
FIG. 12 is a cross sectional view of the in-tank separator through line 12—12 in FIG. 11.

The separator can be used as an in-line device as shown in FIGS. 1–10, or as an in-tank device as shown in FIGS. 11–12. When used as an in-tank device, various features of the separator 1 are modified to better accommodate this type of application. The separator 1 is disposed in a reservoir tank 83 having a fluid level 85, and the reservoir tank 83 itself includes a gas outlet assembly 87. Instead of the outlet chamber arrangement found in the separator 1 for the stand alone mode, the separator 1 in the in-tank mode includes an anti-swirl or anti-cavitation chamber 89. The anti-swirl chamber 89 is preferably circular in cross section, is concentric with the upper and lower chambers, and has a chamber diameter 91 that is larger than the upper and lower chambers which causes the exiting fluid to decelerate and flow upwards into the reservoir tank 83. Any small entrained gas bubbles carried out with the oil are forced to flow, via buoyancy, into the vapor space 93 above the fluid level 85. Gas entering the vapor space 93 exits the reservoir tank 83 via the gas outlet assembly 87. For pressurized reservoir tanks, the gas outlet assembly 87 is routed back to the vortex finder tube 67 downstream of the pressurization valve 95. Thus, the pressurization valve 95 can control both the air exiting the separator and the reservoir tank pressure. To further prevent gas entrainment when the fluid is returned to the reservoir tank 83, the anti-swirl chamber 89 has an outlet annulus 97 that faces upward and has a sufficient open area to insure low fluid outlet velocity. In addition, the outlet annulus 97 is preferably below the fluid level 85. The anti-swirl chamber 89 arrangement and the ability in an in-tank separator to discharge the fluid directly into the fluid reservoir does not impede rotation fluid flow and, therefore, drastically reduces fluid exit losses.

Overall, the three-phase separator depicted in FIGS. 1–12, produces improved separation of the three phases of matter and improved operating efficiencies such as transport efficiency, capture efficiency, and indication efficiency. Transport efficiency is the amount of solid debris particles of a given size that enter the separator, versus the number of particles of the same size that exit the debris exit port of the separator. Capture efficiency is the amount of solid particles of a given size caught on the chip collector in the debris exit passageway versus the number of particles of the same size that enter the separator's chamber. Indication efficiency is the amount of particles of a given size that are indicated by a debris sensor versus the number of particles of the same size that enter the separator's chamber. These improvements are realized by insuring that the majority of the rotating liquid phase does not reverse itself during its passage from the separator's inlet to oil outlet ports, efficiently returning the oil rotation motion to pressure energy upon exiting the separator 1 by using the tangential fluid outlet 51, regulating the separator 1 back pressure in order to control the diameter of the central light gas phase, using the combination of an axial-annular gap formed between the downstream end 27 of the lower chamber 5 and the air column support platform, and minimizing pressure drop resulting from friction losses created by the fluid's motion during passage through the separator 1, allowing greater air-oil separation efficiencies at actual air-oil ratios of less than 1.0.

In-tank versions of the three-phase separator 1 have a very efficient oil outlet configuration which has less pressure drop compared to the stand alone versions. The separator 1 when used inside such reservoirs reduces oil dwell time by forcibly removing the air immediately upon entry into the separator device. The separator allows reservoir dwell times (minimum oil volume in gallons divided by gallons per second oil flow rate) to be reduced to 4 seconds. When the three-phase separator 1 is used in place of a conventional air-oil cyclonic separator inside an aircraft scavenge lube system oil reservoir, wear debris health monitoring of the engine can be accomplished with minimal increase in scavenge pump discharge pressure.

Fluid acceleration, fluid viscosity, difference in densities of the solid versus the liquid phase, mass of solid phase, and residence time determine the size and shape of the separator, the location and configuration of the inlets and outlets, and the transport, capture, and indication efficiencies of solid debris particles.

For circular motion, the acceleration toward the center of the circle is given as $V^2/r$, where V is speed and r is the radius of the circle. In the case of the separator 1, the fluid acceleration rate is expressed as multiples of gravity or 'G's as indicated in the following equation.

$$‘G’s = V^2/(r \times 32.2)$$

where:

'G's=acceleration expressed in multiples of gravity 32.2 ft/sec².

V=air/oil separator chamber inlet port velocity (ft/sec.)

r=separation chamber radius (ft)

Thus, the separator 1 can be sized based upon a selected fluid acceleration rate. Particles, such as debris, suspended in the rotating fluid and hence rotating therewith will be subjected to a centrifugal force. Centrifugal force is expressed generally as $m(V^2/r)$ where m is the mass of the debris particle and is equal to the weight of the particle (W) divided by gravity (g). Therefore, from the fluid acceleration rate equation, the centrifugal force acting on a solid debris particle can be calculated based upon the fluid acceleration rate as shown in the following equation.

$$\frac{WV^2}{gr} = Vol_p \times \Delta_{PM} \times \frac{V^2}{gr}$$

Where:

$Vol_p$=Volume of particle (cu-ft)

$\Delta_{PM}$=Mass density difference between the oil and the solid particle (lb/ft³).

Therefore, the centrifugal force is directly proportional to the fluid acceleration rate, and increasing the fluid acceleration rate, that is increasing the speed or decreasing the radius, increases the centrifugal force. As the fluid acceleration rate increases within the separator 1 chamber the viscous liquid boundary layer at the fluid-to-chamber wall interface ceases to exist and the liquid impinges on wall protrusions due to surface finish. This occurs when the flow regime changes from laminar to turbulent flow. This causes fluid friction, which in turn results in an increase pressure drop across the three-phase separator 1. Pressure drop associated with fluid-to-wall turbulent flow can be decreased by decreasing wall protrusions or increasing the smoothness of the wall. High-grade chamber surface finishes will reduce friction losses when the flow regime is turbulent. For in-tank versions of the separator 1, FIG. 1, the chamber wall finish is normally as cast, while the stand-alone versions, FIG. 11, have a machined finish.

Kinematic viscosity of the fluid also contributes to pressure loss across the separator. Pressure drop decreases as vortex fluid motion inside the separator decreases, and normal pipe flow is established. At viscosity's greater than 30 centipoise the rotational fluid vortex motion inside the separator is effectively destroyed. Flow through the separator then resembles normal pipe flow. However, the creation of a vortex in the separator is needed to effect separation; therefore, fluids having a viscosity in the separator 1 of less than or equal to 30 centipoise are preferred. Moreover, Newtonian fluids are preferred over other types of fluids because Newtonian fluids change viscosity with change in temperature only and are not shear sensitive. Thus, neglecting inlet and outlet friction losses, fluid acceleration and fluid kinematic viscosity alone determine pressure drop across a cyclonic. The higher the fluid acceleration rates the higher the pressure drop.

Although inlet and outlet losses were neglected above, 14% of the overall pressure drop across the separator 1 can be attributed to inlet and outlet friction losses. Therefore, for a given fluid acceleration rate and viscosity, reducing pressure drop across the separator 1 can be accomplished by decreasing the fluid-to-wall turbulent flow, the inlet pressure losses due to friction, and the outlet pressure losses due to friction. Decreasing the inlet and outlet pressure losses is accomplished for example by changing the inlet and outlet to a tangential connection.

Average residence time (seconds) is calculated as follows:

$$Seconds \left[ \frac{Vol_{ch}}{\frac{GPM_1}{60}} \right]$$

Where:

$Vol_{ch}$=Separator Chamber Volume down to debris exit chamber (Gallons)

$GPM_1$=Inlet flow rate of Air+oil (Gallons Per Minute)

For particles having a mass equal to or greater than 1.2236E-05 grams, and an oil viscosity less than 11

Centistokes, the air-oil mixture acceleration (normally expressed in multiples of gravity, or 'G's) inside the three-phase separator determines the capture efficiency of the wear particles. High acceleration rates are required for small particles. A comparison of separation versus 'G' would be as follows. At approximately 50 'G' air-oil separation approaches optimum. At higher 'G' levels wear particles contained in the oil phase start to separate out into the debris exit passageway, and at 1,000 'G' 100% particle capture efficiency is achieved for particles down to 250×250×25 micron.

In operation, a mixture to be separated such as the three-phase mixture is introduced into the upper cylindrical chamber 3 through the tangential inlet 16. Upon introduction, the mixture begins to rotate in the direction of arrow A, creating a vortex having a centrifugal force field progressing down the upper chamber 3 from the first to the second end. The mixture when subjected to this centrifugal force field separates according to density differences between the phases. Because the three-phase mixture is constrained by the separator chambers, the rotating three phase mixture axially displaces the phases within the separator 1. Because the centrifugal force is greater than the gravitational field of the earth, mounting attitude of the separator has no effect on air-oil separation, or particle transport, capture, and indicating efficiencies.

As the rotating mixture passes down the upper chamber 3 from the first end 9 to the second end, the liquid phase travels radially outward towards the wall 12. The solid phase, i.e., debris particles, is heavier than the liquid phase and travels outward until it hugs the wall 12. The solid phase is forced to rotate by the liquid phase it resides in.

As the rotating mixture transitions from the upper chamber 3 to the lower chamber 5, the debris that is hugging the wall 12 becomes trapped in the debris collector 35. The debris that enters the debris collector 35 can be retained there or conveyed by a small slip stream of the liquid medium through the debris slipstream outlet 43, where it is retained, removed, or quantitatively measured. The small liquid transport slipstream can be introduced back into the fluid flow that exits the separator's fluid outlet 51.

The bulk of the fluid passes the debris collector 35 and continues to rotate as it passes through the lower chamber 5 from the upstream end 25 to the downstream end 27. The fluid ultimately enters the outlet chamber 7 where as it rotates it passes out through the tangential fluid outlet 51 that is aligned according to the direction of rotation of the fluid.

As the liquid phase rotates and is displaced radially outward, the gas phase is displaced toward the center of the separator 1. This results in a rotating central gas column. The size of the central gas column is controlled by the gas outlet port 65 in the vortex finder tube 67, the size of the fluid outlet 51 in stand-alone versions of the separator 1, and by the space 79 formed between the gas support platform top 77 and the downstream end 27 of the lower chambers. As the gas progresses down the separator, it contacts the gas support platform 75 and is directed toward the vortex finder tube 67 and out of the separator 1.

The separator 1 can be applied to various three-phase separation systems. For example, the separator device can remove air and wear debris from lube oil in gas turbine, scavenge-type lube system. Scavenge lube pumps normally contain between 1 to 4 parts standard air (Air @14.7 psia, 70° F.) to 1 part oil by volume.

EXAMPLES

Figure 13:
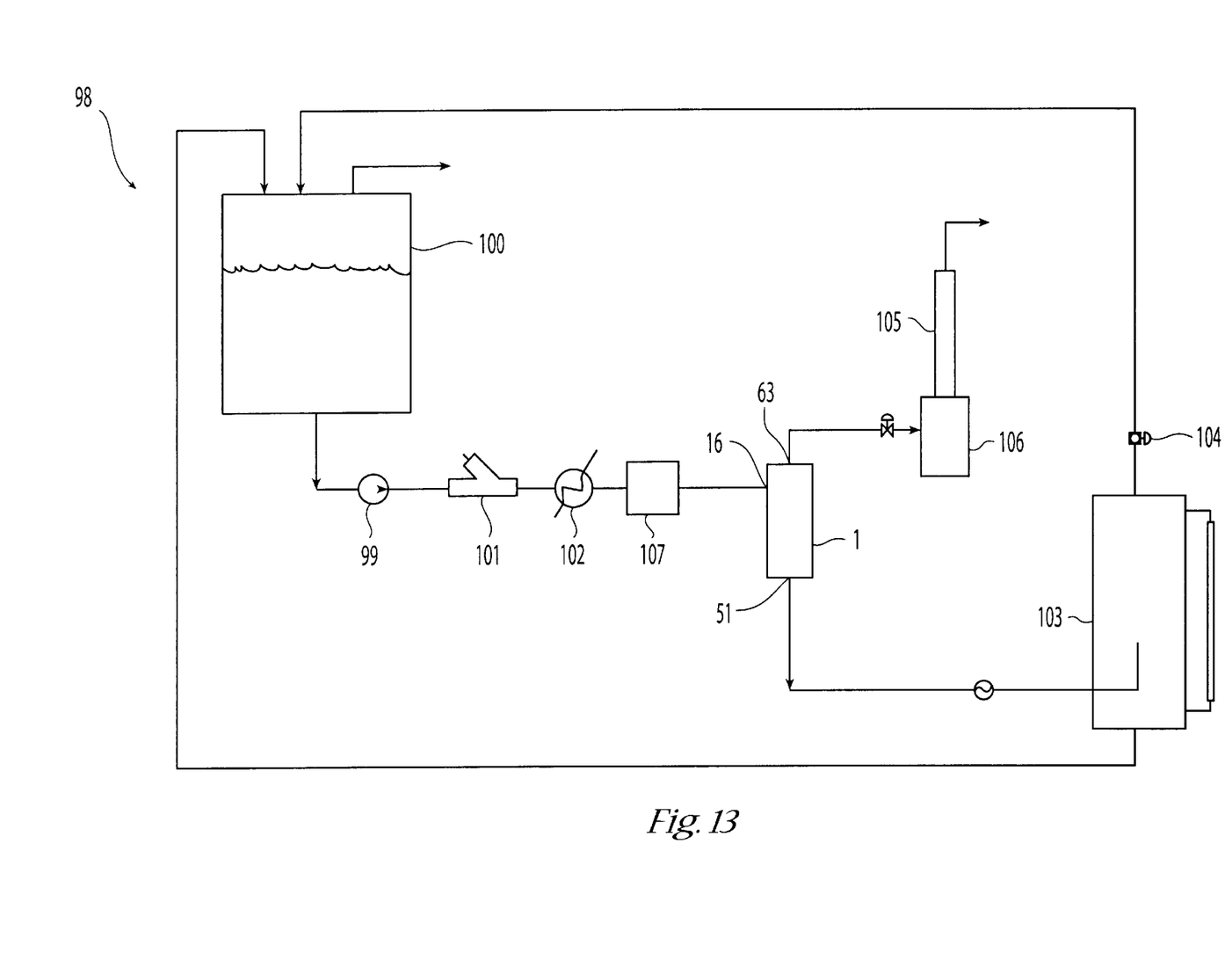
FIG. 13 is a schematic representation of a test system used to test the separator of the present invention.

Tests were conducted to determine the air-oil separator efficiency and capture efficiency at various air-oil-debris mixture flow rates (different 'G' levels). The evaluation test system 98 that was used to test the capture, air-oil separation efficiencies of the three-phase separator 1 is depicted in FIG. 13. The test system 98 utilized a positive displacement gear pump 99 to mimic a typical gas turbine engine scavenge pump.

The scavenge pump 99 drew oil out of the oil supply reservoir 100 and directed it to the inlet 16 of the separator 1. Prior to the oil reaching the inlet 16, it passed through a mixing tee 101 where dry air was mixed in specific quantities with the oil, then the air-oil mixture passed through a heat exchanger 102 where it was heated to the desired test temperature.

Oil exiting the three-phase separator's fluid outlet 51 was directed into an air displacement tank 103 where any air contained in the oil easily settled out of the oil and formed a vapor space in its upper regions. The vapor space only formed when shutoff valve 104 was in its closed position. This valve 104 was normally open to allow the air separated out of the lube oil exiting the three-phase separator 1 to vent back to the systems oil supply reservoir 100. As more air entered the displacement tank 103 it built up pressure and began to displace the oil contained in it. By measuring the oil displacement over time, plus, by monitoring the temperature and pressure of the air in the displacement tank's vapor space, the volumetric flow rate of the air contained in the oil exiting the three-phase separator was calculated as follows:

Calculation of actual air volume growth rate in the displacement tank 103, $$ACFM = [Gallons\_disp \times 0.133] \div Disp\_time$$

Where:
ACFM=Actual cubic feet per minute (at displacement tank 103 vapor space pressure and temperature).
Gallons_disp=Gallons of oil displaced over a 3 linear inch distance. The displacement tank 103 has been calibrated to determine gallons per inch of displacement.
Disp_time=time to displace the oil 3" inches in the displacement tank (minutes).

Calculation of SCFM of air growth in the displacement tank was based upon the ideal gas equation as follows, $$\left[\frac{SCFM \times 14.7}{460 + 70}\right] = \left[\frac{ACFM \times (14.7 + PSIG)}{460 + F}\right]$$

Where:
SCFM=Standard cubic feet of dry air per minute at 70° F., 14.7 psia. Density of dry air at these standard conditions is 0.07495 lb/ft$^3$.
F=Temperature of the air in the displacement tank's vapor space (° F.)
PSIG=Pressure in the displacement tanks vapor space (psig).

By knowing the amount of air entering the system and the amount of air that exits with the oil leaving the three-phase separators oil outlet port the air separation efficiency was calculated as follows:

$$Air\_eff\ \% = \left[1 - \left[\frac{SCFM_{oil\_out}}{SCFM_{inlet}}\right]\right] \times 100$$

Where:

SCFM$_{oil\_}^{out}$=SCFM of air exiting the three-phase separator's fluid outlet SCFM$_{inlet}$=SCFM of air entering the three-phase separators inlet.

Air_eff%=Air separation efficiency. Percentage of original inlet air exiting the three-phase separators air vent connection.

When an in-tank three-phase separator was tested, the air outlet port of the separator was combined with the lube tank breather vent. This gave the air a second chance to escape. Air separation efficiency in an in-tank three-phase separator was normally 100% for oil dwell times down to 4 seconds.

Air that exited the three-phase separator's gas outlet 63 was directed to the systems mist eliminator column 105. Air passing through the mist eliminator 105 had any oil particles removed out of it by a coalescing process. The coalescing process removes 97.97% of all oil mist particles contained in the vent air mixture down to 0.03 microns diameters. The percentage of oil mist particles that exit the coalescer column are a negligible amount that need not be considered in the oil separation efficiency calculations that follow.

Oil particles, removed via the coalescing process in the mist eliminator 105, fell by gravity into the systems oil catch pot 106. The oil catch pot 106 was mounted on a weigh scale. Oil mass build up over time in the catch pot 106 was measured to obtain a mass oil build up in the catch pot (lb/mm). By knowing the amount of oil that entered the separator's fluid inlet 16, and the amount of oil exiting with the gas outlet 63, the oil separation efficiency was calculated as follows, $$\text{Oil\_eff \%} = \left[1 - \left[\frac{gpm_{out}}{gpm_{inlet}}\right]\right] \times 100$$

Where:

Oil_eff%=Percentage of inlet oil that exits the fluid outlet of the three-phase separator.

gpm$_{out}$=Gallons per minute of oil exiting the three-phase separator's gas outlet.

gpm$_{inlet}$=Gallons per minute of oil entering the separator's inlet

Values used for the air-oil separation efficiency calculations were an averaged value based upon data readings over the air separation measurement reading time.

In order to measure ferrous debris capture efficiency, ferrous debris particles were injected into the air-oil mixture via a chip injection rack 107. Testing was conducted using ferrous particles punched out of carbon steel shim stock to represent the smallest typical bearing wear particles expected due to spalding. The sizes of individual particles were 250×250×25 micron (equivalent test particle 0.011" diameter×0.001" thick, mass 1.2236E-05 grams).

Debris capture efficiency was dependent upon the mass and shape of the debris particle, fluid viscosity, fluid acceleration rate, and type of debris sensor or collector. By knowing the number of particles of a given size that were injected into the air-oil mixture and the number of particles of a given size that were retained on the chip collectors magnet, the capture efficiency of the separator was calculated as follows:

$$\text{Cap\_eff \%} = \frac{\text{No\_particles\_sizeX\_captured}}{\text{No\_particled\_sizeX\_injected}} \times 100$$

A feed mixture of 15 gallons per minute of oil having 6 scfm of air was introduced into the inlet at a temperature of 247° F. The pressure loss across the separator from inlet to oil outlet was 24 psid. Since separators have to typically operate at 1000 'G's in order to realize a capture efficiency of 60%. By contrast, the test system using the separator 1 according to the present invention achieved a 60% capture efficiency at 650 'G's. The air separation efficiency was 93.56%, and the oil separation efficiency was 99.4%.

What is claimed is:

1. A three phase cyclonic separator comprising:
   a) an upper cylindrical chamber having a first end and a second end;
   b) a lower cylindrical chamber configured and positioned to be concentric with the upper cylindrical chamber and having a downstream end and an upstream end that is in fluid connection with the second end of the upper cylindrical chamber;
   c) a debris collector disposed in the separator for collecting solids from fluids passing therethrough;
   d) an outlet for allowing gases separated in the upper cylindrical chamber and the lower cylindrical chamber to exit the separator;
   e) a tangential inlet connected to the upper chamber between the first and second ends for introduction of a material to be separated; and
   f) a tangential fluid outlet in fluid connection with the lower chamber for allowing fluids to exit the separator.

2. The three phase separator of claim 1 wherein:
   a) the upper chamber has an inner circumference defining an upper chamber diameter;
   b) the lower chamber has an outer circumference defining a lower chamber diameter;
   c) the upstream end of the lower chamber extends into the second end of the upper chamber; and
   d) the debris collector is defined by a gap between the inner circumference of the upper chamber and the outer circumference of the lower chamber.

3. The three phase separator of claim 2 wherein the gap is annular and concentric with the upper and lower chambers.

4. The three phase separator of claim 3 wherein the gap further comprises a tangential debris slipstream outlet to reduce pressure losses associated with the debris collector.

5. The three phase separator of claim 4, further comprising a gas support platform disposed in the lower chamber a sufficient distance downstream of the debris collector to prevent turbulence adjacent the debris collector which would inhibit debris collection.

6. The three phase separator of claim 1, further comprising:
   a) a cylindrical fluid outlet chamber concentric with the upper and lower chambers and having an inlet end in fluid connection with the downstream end of the lower chamber;

wherein the tangential fluid outlet is connected to the fluid outlet chamber to minimize outlet frictional losses.

7. The three phase separator of claim 6 further comprising:
   a) a gas support platform disposed in the fluid outlet chamber; and b) a space between the downstream end of the lower chamber and the gas support platform to prohibit obstruction and constriction of the fluid flow through the separator.

8. The three phase separator of claim 7 wherein the gas support platform is cylindrical and concentric with the fluid outlet chamber for minimizing fluid flow losses.

9. The three phase separator of claim 1, wherein:
a) the upper chamber has an inner circumference defining an upper chamber diameter;
b) the lower chamber has an inner circumference defining a lower chamber diameter; and
c) the lower chamber diameter is smaller than the upper chamber diameter.

10. A three phase cyclonic separator comprising:
a) an upper cylindrical chamber having a first end and a second end;
b) a lower cylindrical chamber configured and positioned to be concentric with the upper cylindrical chamber and having a downstream end and an upstream end in fluid connection with the second end of the upper cylindrical chamber;
c) a debris collector disposed in the separator for collecting solids from fluids passing therethrough;
d) an outlet for allowing gases to exit the separator;
e) a tangential inlet connected to the upper chamber between the first and second ends for the introduction of material to be separated;
f) a fluid outlet in fluid connection with one of the upper or lower chambers for allowing fluids to exit the separator; and
g) a gas support platform disposed in one of said upper or lower chambers and spaced from the debris collector a distance sufficient to reduce turbulence adjacent the debris collector which would inhibit debris collection.

11. The three phase separator of claim 10, further comprising:
a) a cylindrical fluid outlet chamber concentric with the upper and lower chambers and having an inlet end in fluid connection with the downstream end of the lower chamber;
wherein the fluid outlet is disposed in the fluid outlet chamber and tangentially connected thereto to reduce fluid outlet frictional losses associated with converting rotational kinetic energy to pressure energy.

12. The three phase separator of claim 11 wherein the gas support platform is disposed in the fluid outlet chamber and spaced from the downstream end of the lower chamber to prohibit obstruction or constriction of the fluid flow through the separator.

13. The three phase separator of claim 12 wherein the gas support platform is cylindrical and concentric with the fluid outlet chamber for minimizing fluid flow losses.

14. The three phase separator of claim 13 wherein:
a) the upper chamber has an inner circumference defining an upper chamber diameter;
b) the lower chamber has an outer circumference defining a lower chamber diameter;
c) the upstream end of the lower chamber extends into the second end of the upper chamber; and
d) the debris collector is defined by a gap between the inner circumference of the upper chamber and the outer circumference of the lower chamber.

15. A three phase cyclonic separator comprising:
a) an upper cylindrical chamber having a first end, a second end, and an inner circumference defining an upper chamber diameter;
b) a lower cylindrical chamber configured and positioned to be concentric with the upper cylindrical chamber and having an upstream end in fluid connection with the second end of the upper chamber, a downstream end, and an outer circumference defining a lower chamber diameter, wherein the lower chamber diameter is less that the upper chamber diameter, and the upstream end of the lower chamber extends into the upper chamber;
c) a debris collector defined by a gap between the inner circumference and the outer circumference;
d) an outlet for allowing gases to exit the separator;
e) a tangential inlet connected to the upper chamber between the first and second ends for introduction of a material to be separated;
f) a cylindrical fluid outlet chamber concentric with the upper and lower chambers, the fluid outlet chamber having an inlet end in fluid connection with the downstream end of the lower chamber and a tangential fluid outlet for allowing fluids to exit the separator and for minimizing outlet frictional losses; and
g) a gas support platform disposed in the fluid outlet chamber; and
h) a space defined between the downstream end of the lower chamber and the gas support platform to prohibit obstruction and constriction of the fluid flow through the separator.

* * * * *